United States Patent
Hargis et al.

[11] Patent Number: 5,990,983
[45] Date of Patent: Nov. 23, 1999

[54] HIGH RESOLUTION IMAGE PROJECTION SYSTEM AND METHOD EMPLOYING LASERS

[75] Inventors: David E. Hargis, La Jolla, Calif.; Graham Flint, Alburquerque, N.Mex.; Shlomo Assa, Encinitas, Calif.

[73] Assignee: Laser Power Corporation, San Diego, Calif.

[21] Appl. No.: 08/727,618

[22] PCT Filed: Sep. 30, 1994

[86] PCT No.: PCT/US94/11181

§ 371 Date: Jun. 23, 1997

§ 102(e) Date: Jun. 23, 1997

[87] PCT Pub. No.: WO95/10159

PCT Pub. Date: Apr. 13, 1995

[51] Int. Cl.⁶ .................................................. H04N 5/74
[52] U.S. Cl. .......................... 348/758; 348/750; 348/757
[58] Field of Search .................................. 348/758, 757, 348/750, 756, 753; 353/33, 98; H04N 5/74

[56] References Cited

U.S. PATENT DOCUMENTS

| | | |
|---|---|---|
| 3,507,984 | 4/1970 | Stavis . |
| 3,549,800 | 12/1970 | Baker . |

(List continued on next page.)

FOREIGN PATENT DOCUMENTS

| | | |
|---|---|---|
| 458270 | 11/1991 | European Pat. Off. . |
| 488903 | 6/1992 | European Pat. Off. . |
| 660593 | 6/1995 | European Pat. Off. . |
| 676740 | 10/1995 | European Pat. Off. . |
| 696875 | 2/1996 | European Pat. Off. . |
| 2371107 | 6/1978 | France . |
| 2577371 | 8/1986 | France . |
| 2581780 | 11/1986 | France . |
| 31 37 031 | 4/1982 | Germany . |
| 31 52 020 | 7/1983 | Germany . |
| 41 39 842 | 3/1994 | Germany . |
| 43 24 849 | 2/1995 | Germany . |
| 43 11 112 | 5/1995 | Germany . |
| 195 06 595 | 2/1996 | Germany . |
| 195 01 525 | 4/1996 | Germany . |
| 196 32 089 | 2/1997 | Germany . |
| 56-109314 | 3/1990 | Japan . |
| 2-244022 | 9/1990 | Japan . |
| 2252472 | 8/1992 | United Kingdom . |
| 90/13158 | 11/1990 | WIPO . |
| 91/11820 | 8/1991 | WIPO . |
| 92/03862 | 3/1992 | WIPO . |
| 92/22109 | 12/1992 | WIPO . |
| 94/18802 | 8/1994 | WIPO . |
| 95/10159 | 4/1995 | WIPO . |
| 96/03676 | 2/1996 | WIPO . |

OTHER PUBLICATIONS

Yamamoto et al., *Laser Displays*, pp. 1–63.

*Primary Examiner*—Victor R. Kostak
*Attorney, Agent, or Firm*—Knobbe, Martens, Olson & Bear, LLP

[57] ABSTRACT

An image projection system employing microlaser and/or diode laser arrays. Each laser in each array is individually addressable. The system includes three linear laser arrays, one red, one green, and one blue, each individually addressable laser being powered and modulated in accordance with the input image signal. When microlaser arrays, which are energized by laser diode pumps, are used, the laser diode pumps are formed in equivalent arrays. The laser output beams are combined in a dichroic prism and reflected off a rotating multifaceted scanning mirror which effects two dimensional scanning as it rotates. The image beam reflected from the scanner passes through an imaging lens, a speckle eliminator and then onto the projection screen. The invention also includes the method of generating and scanning the image beam, as well as the novel speckle eliminator and the microlaser array configured for optimally close spacing to achieve the desired result. In one embodiment, the laser diode pumps are directly modulated by the video signal, while in another embodiment the microlaser outputs are modulated utilizing a spatial light modulator array.

38 Claims, 7 Drawing Sheets

U.S. PATENT DOCUMENTS

| | | |
|---|---|---|
| 3,571,493 | 3/1971 | Baker et al. . |
| 3,621,133 | 11/1971 | Baker et al. . |
| 3,636,251 | 1/1972 | Daly et al. . |
| 3,721,756 | 3/1973 | Baker . |
| 3,727,001 | 4/1973 | Gottlieb . |
| 3,737,573 | 6/1973 | Kessler . |
| 3,762,791 | 10/1973 | Fournier et al. . |
| 3,818,129 | 6/1974 | Yamamoto . |
| 3,958,863 | 5/1976 | Isaacs et al. . |
| 3,977,770 | 8/1976 | Isaacs et al. . |
| 3,994,569 | 11/1976 | Isaacs et al. . |
| 4,035,068 | 7/1977 | Rawson . |
| 4,110,014 | 8/1978 | Yevick ........................... 350/342 |
| 4,155,630 | 5/1979 | Ih . |
| 4,380,023 | 4/1983 | Mir et al. . |
| 4,390,235 | 6/1983 | Minoura . |
| 4,470,075 | 9/1984 | Yoshimoto et al. . |
| 4,517,608 | 5/1985 | Maeda et al. . |
| 4,720,747 | 1/1988 | Crowley . |
| 4,796,961 | 1/1989 | Yamada et al. . |
| 4,851,918 | 7/1989 | Crowley . |
| 4,930,849 | 6/1990 | Tanaka . |
| 5,032,924 | 7/1991 | Brown et al. . |
| 5,033,814 | 7/1991 | Brown et al. . |
| 5,140,427 | 8/1992 | Nakane et al. . |
| 5,185,617 | 2/1993 | Takanashi et al. . |
| 5,283,694 | 2/1994 | Frady . |
| 5,317,348 | 5/1994 | Knize ........................... 353/31 |
| 5,424,771 | 6/1995 | Yu . |
| 5,440,352 | 8/1995 | Deter et al. . |
| 5,485,225 | 1/1996 | Deter et al. . |
| 5,517,359 | 5/1996 | Gelbart . |
| 5,519,518 | 5/1996 | Watanabe et al. . |
| 5,552,916 | 9/1996 | O'Callaghan et al. ........... 359/95 |
| 5,610,647 | 3/1997 | Takada . |
| 5,694,180 | 12/1997 | Deter et al. . |
| 5,715,021 | 2/1998 | Gibeau ........................... 348/756 |

FIG. 12A

HIGH RESOLUTION IMAGE PROJECTION SYSTEM AND METHOD EMPLOYING LASERS

TECHNICAL FIELD

This invention relates to image projectors using lasers for a source of light. More specifically, it relates to projection display systems wherein solid state microlasers or heterostructure diode lasers, or both, are employed in the projection of high resolution full-color images.

BACKGROUND ART

Rapid advances in processing of information have placed ever increasing demands on the display systems which transfer critical information to the decision makers in a variety of settings. One serious limitation has been in the area of the quality of display systems meeting the demands of high frame rates and high resolution with compact, cost effective, and efficient optical sources.

Two basic principles, light-modulation and direct emission, are used in video projectors. In a light-modulation design, a beam of light passes through an optical array which is capable of switching individual display elements (pixels) on or off. Liquid crystal display (LCD) panels are common light modulators. Other, more exotic modulators, such as oil films and deformable micro-mirrors, are also available. Direct-emission projectors emit their own-light. The most common direct-emission device is the CRT projector, used in home TV projectors and in high power versions for large screen industrial use. Direct-emission projectors are inherently simpler than light-modulation projectors. Conceptually, the direct emission projector consists only of a controllable light source and optics. The evolution of the CRT projector illustrates how, owing to its inherent simplicity, a direct-emission display mechanism can be readily produced and later scaled-up to higher brightness and resolution levels.

As the resolution requirement of high definition television (HDTV) and computer displays increase, CRT-based projectors reach some basic physical limits. A breakthrough is necessary to extend the resolution and brightness limits of this mainstream projection technology. Unfortunately, there are very few viable direct-emission technologies, so designers have looked for other ways to project video and computer information. The result is a host of light-modulation projectors using many different techniques. However, projectors of this type share a set of common problems. One of them is the need for an efficient light source which maximizes the amount of light that is passed through the modulator. Also, the modulation device must be scalable to a reasonably small size. The design issues associated with these needs are difficult and complex, and in many cases they directly limit the achievable results.

To better understand the nature of limitations associated with previous technology, it becomes instructive to review briefly the operating characteristics of four principal contenders in the video projection arena. In order of review, these can be identified as CRT projectors, light valve projectors, passive-matrix panels and active-matrix panels.

CRT Projectors: Projection CRTs are similar to conventional monochrome CRTs, except that they are operated at much higher beam currents. Color systems are built using three independent CRT systems, each with its own lens. The user must make periodic convergence adjustments to bring the three beams into color registration. Attempts to produce single-lens projectors, where the three color tubes are internally converged at the factory, have not been widely accepted.

Light Valve Projectors: Light valve projectors have been developed to overcome some of the deficiencies of the CRT projectors. An advantage of light valve systems is that the light source and modulating element are decoupled. Light valve projectors based on the electron beam oil film light valve were developed over 25 years ago. In such systems, an oil film is used as the image source. Intensity of the projected light is controlled by the amplitude of the deformation of the oil film. However, they are very complex, bulky, expensive, and are difficult to set up and maintain.

An alternative to the oil film approach is provided by the LCD light valve. Here the LCD matrix is not used as a simple shutter that reduces the input light, but a stimulus responsive to the input signal is used to activate the LCD material, which then is coupled to a separate output light source. Extremely high resolutions (5000×7000) have been achieved via the LCD approach. However, due to thermal inertia, the writing rate is very slow at this resolution, requiring 3.5 minutes to update a display using two 40 milliwatt lasers. Ultra high resolution is thus offset by very slow writing speed and very high cost.

Passive-Matrix Panels. A simpler method for using an LCD panel as a light modulator is that of interposing the panel between a light source and the projection optics. Such panels can be activated by either of two approaches, either passive-matrix and active-matrix. In both passive and active drive technologies, the LCD cells are arranged in a matrix of rows and columns, and are driven by row and column driver circuits. In a passive-matrix drive system, the LCD cell alone exists at each intersection. A time-multiplexing scheme is used to energize each of the LCD cells in the matrix. Unfortunately, the slow response time of passive-matrix panels makes them unsuitable for displaying quickly changing information such as television signals. Also, crosstalk between LCD cells is a significant disadvantage.

Active-Matrix Panels: An active-matrix panel contains a switching device such as a thin film transistor (TFT), and a storage element (capacitor), in addition to the LCD cell at every LCD site. Each switch/capacitor acts as a "sample-hold" (S/H) circuit for the briefly appearing pulses from the multiplexed drive system. Each LCD cell, driven by its own S/H circuit, is thus decoupled from the other LCD cells, minimizing crosstalk. Furthermore, active-matrix LCD cells can be formulated to respond quickly. Update rates under 50 milliseconds are easily achieved with active-matrix panels. However, active-matrix panels are not easy to manufacture, requiring an impressive range of challenging technologies. The overall yield is the product of a series of process steps, at each of which losses typically occur.

The use of lasers in the production of images, and in particular, the production of a sequential set of electrical signals which represents an original picture for direct display through the use of lasers ("video imaging") is known in the art. See for example, U.S. Pat. Nos. 3,549,800 and 3,721,756 (Baker); 3,571,493 and 3,621,133 (Baker et al.); 3,737,573 (Kessler); 3,818,129 (Yamamoto); 3,958,863, 3,977,770, and 3,994,569 (Isaacs et al.); 3,636,251 (Daly et al.); and 4,720,747 and 4,851,918 (Crowley). See also, Taneda et al., "High-Quality Laser Color Television Display," Journal of the Society of Motion Pictures and Television Engineers, Volume 82, No. 6 (1973); Taneda et al., "A 1125 Scanning-Line Laser Color TV Display," SID International Symposium and Expedition (1973); and Yamamoto, "Laser Displays," Advances and Image Pick-up and Display, Academic Press, Inc., Vol. 2 (1975); and Glenn, "Displays, High Definition Television and Lasers," SID International Symposium and Expedition (1993). For general references to video imaging, see U.S. Pat. Nos. 3,507,984, (Stavis); and 3,727,001 (Gottlieb).

None of the above mentioned patents relate either to diode pumped microlaser technology or to laser array based approaches. Relevant to the present invention, research is ongoing into a variety of red, green and blue (RGB) solid state laser projection technologies. Such work encompasses electrically pumped blue/green semiconductor lasers, non-linear mixing or frequency doubling of infrared lasers, and infrared-diode-pumped solid state upconversion lasers. All of this work, however, is concentrated on singular red, green and blue sources which, individually, are capable of providing sufficient power at one or other of the colors to provide a brightly illuminated display as opposed to the array approach of this invention as described below.

Possible applications for improved laser projection display systems are for those who need full multimedia integrated projectors. Examples are corporate, industrial, and institutional organizations which make presentations to groups ranging in size from 2 to 500 people. Such users demand good image quality, full motion capability, and integrated sound for their computer and audio/visual (A/V) presentations.

DISCLOSURE OF INVENTION

Broadly speaking, the invention comprises a video display system which uses diode-pumped microlaser and/or diode laser array sources to produce images. The practical purpose of the invention is to achieve a high brightness (>1000 lumens) projection display on a screen of approximately 7.5 feet diagonal which combines HDTV resolution with 24-bit color.

In its essence, the invention is a high resolution image projection system comprising: an array of a multiplicity of lasers for each of the three primary colors of the image projection system; means for individually addressing each said laser in each said array; means for modulating the beam intensity output of each said laser; means for combining the outputs of each said laser so that those outputs are in precise registration with each other; apparatus for two dimensional scanning of the outputs of each said combined laser beam output; and optical means for forming the scanned beams into a projection beam.

A representative display system utilizes three linear arrays of 120 laser elements each—one red, one green, and one blue array. A particular configuration of such an array is disclosed herein. The arrays of light sources are scanned in two dimensions. During each horizontal scan 120 video lines are written, requiring 10 scans to complete a 1200 line image. While being scanned, the intensities of the lasers are modulated directed via the near-IR diode laser pumping energies, the currents to which diodes are so modulated. Alternatively, the microlasers can be run in a continuous wave mode and a linear array of external intensity modulators can be utilized.

This type of scanning is preferably accomplished with a polygonal scanner which has successively tilted facts. The tilt angle between two adjacent facets is such that the projected image moves down 120 lines when the next horizontal scan is performed. The tolerance requirements on the facet angles are well within that achievable with diamond machining.

An advantage of this approach is that the required amplitude modulation bandwidth of an individual beamlet is reduced by 120, as compared to a single beam approach, due to the parallel nature of the scanning configuration.

The requirement for an external modulator can be eliminated if the individual laser elements are modulated directly by means of an electrical signal sent to the array.

This invention also includes means to reduce or remove speckle, which typically is associated with monochromatic light sources by the incorporation of a speckle eliminator within the projection system.

These parameters will be used in the following description of the invention, with the understanding that they are examples only. The image may consist of more or less than 1200 lines and each laser array may have other than 120 elements.

BRIEF DESCRIPTION OF DRAWING

The objects, advantages and features of this invention will be more readily appreciated from the following detailed description, when read in conjunction with the accompanying drawing, in which.

BEST MODES FOR CARRYING OUT THE INVENTION

Recent advances in diode laser-pumped solid-state lasers have made possible compact, efficient, visible, coherent microlaser sources. Applications requiring small size and low weight are a perfect match for microlaser projection systems. Such devices utilize the well developed near-IR diode laser technology as a pump source for rare-earth ion doped solid-state lasers, thereby facilitating the conversion of the near-IR radiation to coherent, narrow band, visible light. Additionally, ongoing research visible heterostructure diode lasers promises compact red, green and blue diode laser arrays which are amenable to the disclosed display configuration.

The direct-emission laser approach of this invention is intended to eliminate the projector design problems represented by exiting technologies as set out above. Gone is the high intensity light source with its efficiency problems, the heat-absorbing light valve with its aperture limits, and the exotic mechanical systems that are finicky and expensive. Because they don'require bulky deflection systems and optics, and because of their inherent miniaturization, very bright and compact projectors are made possible using laser projector technology. The potential ease of incorporation into projection systems make this approach a revolutionary one, not just an evolutionary extension of the previous technologies, some of which date back over 20 years.

To compare microlaser projection technology with conventional technologies, it is instructive to examine two fundamental parameters which relate to their ultimate practicality. The first parameter can be defined as optical efficiency—in this case, the lumens of output per watt of input to the light source. The second is cost compatibility, that is, the extent to which the technology in question yields a cost effective solution to the requirements of a specific application. As an abstract from a paper by William Glen at the OSA Conference on Compact Blue-Green Lasers (February 1993), the parameters for the technologies which might possibly compete for the medium-screen and large-screen display market are listed in Table 1.

To satisfy typical HDTV requirements, an array of 1,200 lasers can be scanned horizontally in approximately 14.3 ms to attain a resolution of 1200 lines by 1400 pixels. Alternatively, arrays containing fewer individual microlasers can be used in a variety of multi-scan geometries. For example, in the multi-scan approach disclosed herein, three linear arrays of 120 microlaser elements each are employed—one red, one green, and one blue array. The arrays of light sources are scanned in two dimensions. With each horizontal scan 120 video lines are written, requiring 10 scans to complete the 1200 line image. While the lasers are scanned they are intensity modulated directly by means of the electrical current applied to the individual diode laser pumping sources.

Figure 1:
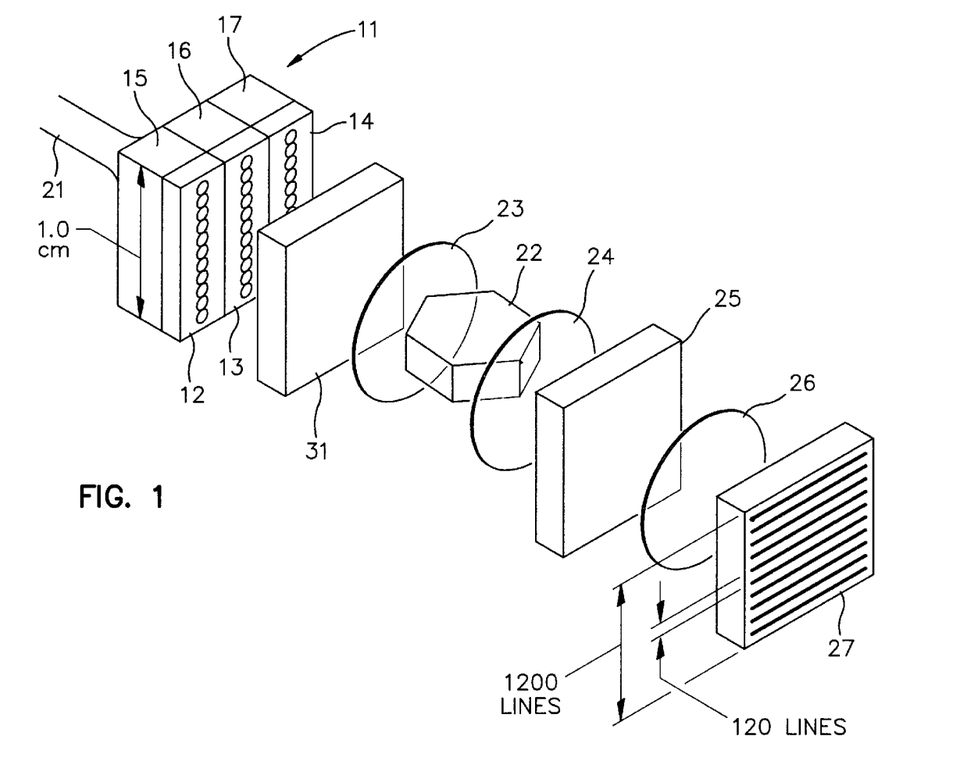
FIG. 1 is a conceptual schematic diagram of a basic embodiment of the system of the invention.
Figure 2:
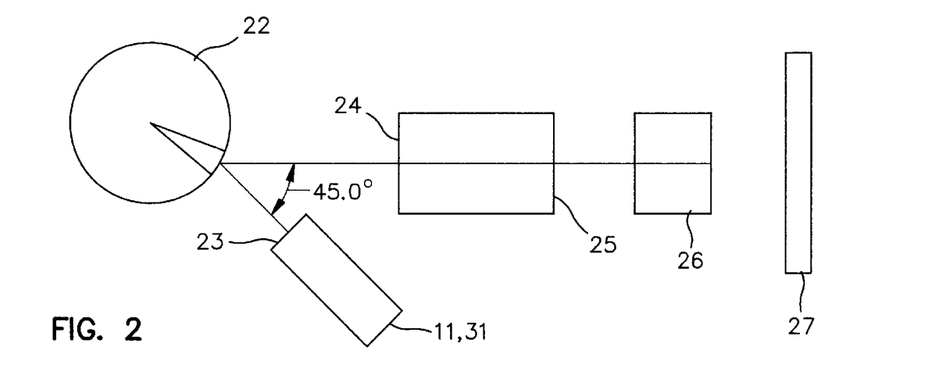
FIG. 2 is a schematic diagram of the functional elements of the invention.

An exemplary embodiment of the invention is shown in FIGS. 1 and 2. In these figures there is shown light generator microlaser array module 11 comprised of array 12 of 120 red microlaser elements, array 13 of 120 green microlaser elements, and array 14 of 120 blue microlaser elements. Directly adjacent each microlaser array is equivalent pumping diode array 15, 16, and 17, respectively. Video or image signals, which control diode power, are applied to the pumping diodes through cable 21. The powered and modulated light beams from arrays 12, 13, 14 are applied to

TABLE I

Display--Efficiency--Cost

| Display Type | Efficiency (lumens/watt) | Power Required (Watts) | | System Cost |
|---|---|---|---|---|
| | | Medium-Size Screen | Large-Size Screen | |
| Electroluminescence | 0.4 | 2,500 | No | High |
| Gas Laser | 0.1 | 10,000 | 100,000 | High |
| Gas Plasma | 0.25 | 4,000 | No | Medium |
| CRT Direct View | 4 | 250 | No | Medium |
| CRT Projector | 0.5 | 2,000 | 20,000 | High |
| Light Valves | 4 | 250 | 2,500 | Low |
| Solid-State Lasers | 30 | 30 | 300 | Medium |

In context of medium-size projectors, it is evident from the above Table that the field of efficient cost-effective technologies narrows immediately to CRT direct view, light valves and solid-state lasers. Meanwhile, in the large-screen arena, there is a short list of two, namely, light valves and solid-state lasers. Hence, the competition between technologies which exhibit compatibility with both medium-size and large-size projection becomes one between light valves and solid-state lasers.

The heart of the disclosed high resolution projection system preferred embodiment employs visible microlaser technology. As mentioned previously herein, heterostructure diode lasers may be used alternatively to microlaser arrays and their pumping laser diodes. The specific example employs microlasers so either that term or the word "lasers" will be used herein to encompass both types of light emitters.

A red/green/blue (RGB) microlaser system, consisting of three lasers or laser arrays, each operating at a fundamental color, is the most efficient, high brightness, white light projection source for display applications to date. In this context, microlaser operation has been achieved at 650 nm, 530 nm, 470 nm, and 450 nm, as discussed below. An optical source with this spectrum provides a greater color gamut than conventional liquid crystal light valve (LCLV) approaches and projection technologies which use blackbody spectrum optical sources.

scanning polygon 22 through relay lens assembly 23. The scanning light beams then pass through imaging lens assembly 24, speckle eliminator 25, projection lens 26, and onto projection screen 27. The speckle eliminator is a preferred element of the system, but it is not an essential element.

Many high resolution formats can be achieved with the array approach and with the apparatus shown in FIGS. 1 and 2, or a modification thereof. For example, to satisfy the HDTV requirements of 120 lines by 1400 pixels with a frame refresh rate of 70 Hz non-interlaced, the individual microlasers within a 120 element array can be intensity modulated at a rate of 490 KHz. Meanwhile, the effective gray level and color of each pixel is determined by the amplitude of the diode current and the relative powers in the RGB beams.

Scanning formats of the above type can be accomplished with polygonal scanner 22 which is configured with successively tilted facets. The tilt angle between two facets is such that the projected image shifts by 120 lines when the next horizontal scan is performed. For example, the tilt angles between two adjacent facets would be 0.6°. Known techniques of diamond machining are sufficient to form such a scanner wheel.

A complete projection system based upon the above described technique, a schematic of which is shown in FIGS. 1 and 2, accepts the outputs of three laser arrays, combines them, scans them, and projects them as a picture upon a large screen. As evidenced from the figures, the optical train following the laser arrays comprises six principal elements. These are dichroic prism combiner 31, relay lens 23, polygonal scanning mirror 22, imaging lens 24, speckle elimination element 25, and projection lens 26. The final image is focussed onto projection screen 27.

Figure 3:
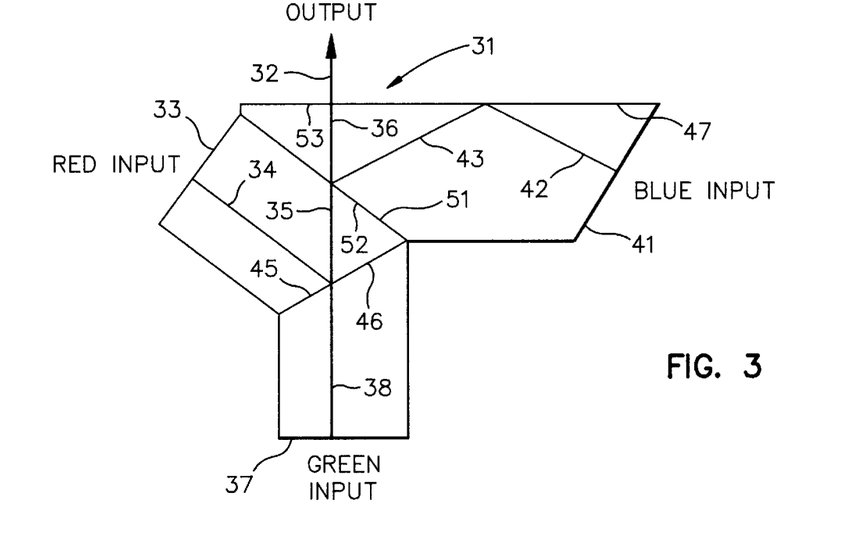
FIG. 3 is a plan view of a dichroic prism assembly used in the system of the invention.

The geometry of dichroic prism combiner 31 of FIG. 3 is arranged such that, when viewed from prism output 32, the outputs from individual microlaser arrays are precisely registered one with respect to another. From FIGS. 6 and 7 it can be seen how the microlaser arrays are arranged with respect to the dichroic prism. Red array 12 is paired with and abuts against face 33 of the prism. The red microlaser output light beam follows path 34, 35, 36 to output beam 32. Green array 13 similarly abuts face 37 of the prism. The green microlaser output light beam follows path 38, 35, 36 to output beam 32. Blue array 14 abuts face 41 of the prism. The blue microlaser output beam follows path 42, 43, 36 to output beam 32. As is well known in the art, faces 45, 47, 51, 52 and 53 of the dichroic prism are appropriately coated to reflect certain wavelengths and to pass others. For example, face 45 reflects the red light waves while faces 52 and 53 are transparent to red. The locations of the red, green and blue inputs with respect to the prism and the structural geometry of the system are such as to allow maximum convenience in microlaser array accessibility. Associated relay lens 23 produces an exit pupil of small diameter, matched with the size of and distance to a face of scanner 22. The location of the pupil is arranged so as to coincide with the surface of the scanning polygon.

Figure 4:
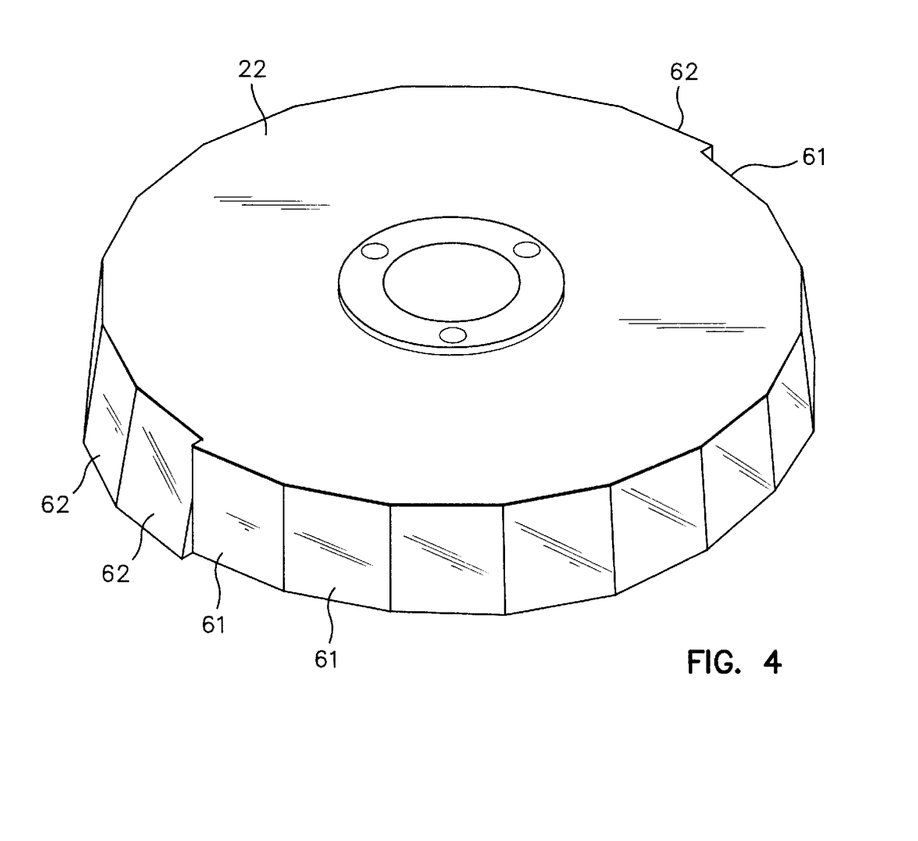
FIG. 4 is a perspective view of a scanning polygon for use with the system of the invention.

A typical tilt-facet polygon scanner 22 which employs a total of twenty facets (two each at ten progressive angles) is illustrated in FIG. 4. The 20-sided scanner is designed with groups of faces 61 and 62, each group of which exhibits ten discrete pyramidal angles, each specific angle being duplicated on diametrically opposed facets. The facets in the first set of ten are designated 61 and the repeating set of ten are referred to with numeral 62. This configuration allows consecutive facets of the scanner to step the picture by 10 percent of the overall picture height. The radius of the polygon is on the order of 50 mm, while the speed of rotation required to achieve 70 frames per second is 2,100 rpm. For this particular configuration, where each scanner facet 61,62 has an angle with respect to the vertical which changes by 0.6° from one facet to the next adjacent facet within each grouping of facets, a 180°-rotation moves the sweep vertically by 6°. The next rotational group starts at the same vertical position and again moves the sweep 6° with another 180° of rotation. In the meantime, each facet subtends a horizontal angle of about 18°. Of course, with different element parameters, these specific details would change.

Imaging lens 24 has been designed to use the output of scanner 22, which is typically collimated, and to provide an exit pupil that is conjugate with the entrance pupil of projection lens 26. This lens is somewhat complex, but that complexity is dictated by its requirement to provide a color corrected diagonal field of about 40 degrees in conjunction with an exit pupil which is located approximately 200 mm beyond the image plane. Compound lens arrangements are within the ordinary skill in the art and will not be described in detail here.

The system shown in FIG. 1 includes projection screen 27, which has certain parameters. As stated previously, that screen may be as large as 7.5 feet diagonal. It may be a flat screen or wall, or a concave screen. The system is suited to any type of projection surface.

Figure 5:
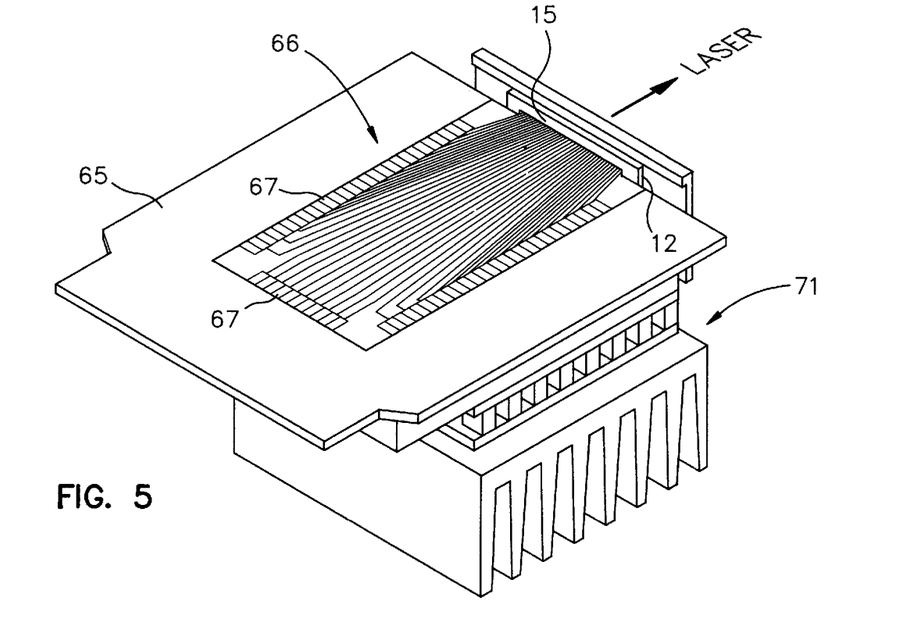
FIG. 5 is a perspective view of a 120-element per centimeter individually addressable microlaser array including a heat sink and a thermoelectric cooler (TEC)

A conceptual layout for a 120-element individually addressed microlaser array is shown in FIG. 5. Board 65 has circuitry 66 printed thereon which provides connectors 67 for the video signals to be conducted to laser diode array 15, for example. These diodes pump the microlasers in array 12 to result in red output light to surface 33 of prism 31. Mounted to the other side of board 65 is the heat sink and TEC 71. When three such arrays (providing red, green and blue light beams) are mounted to the combining prism, they can be integrated into a projection system which takes the form shown in FIGS. 6 and 7. These views of the system demonstrate the three-dimensional relationship between key system elements, namely, the microlaser arrays, the combining prism, the relay lens, the scanning polygon assembly, the imaging lens, the speckle elimination device, and the final projection lens.

Figure 6:
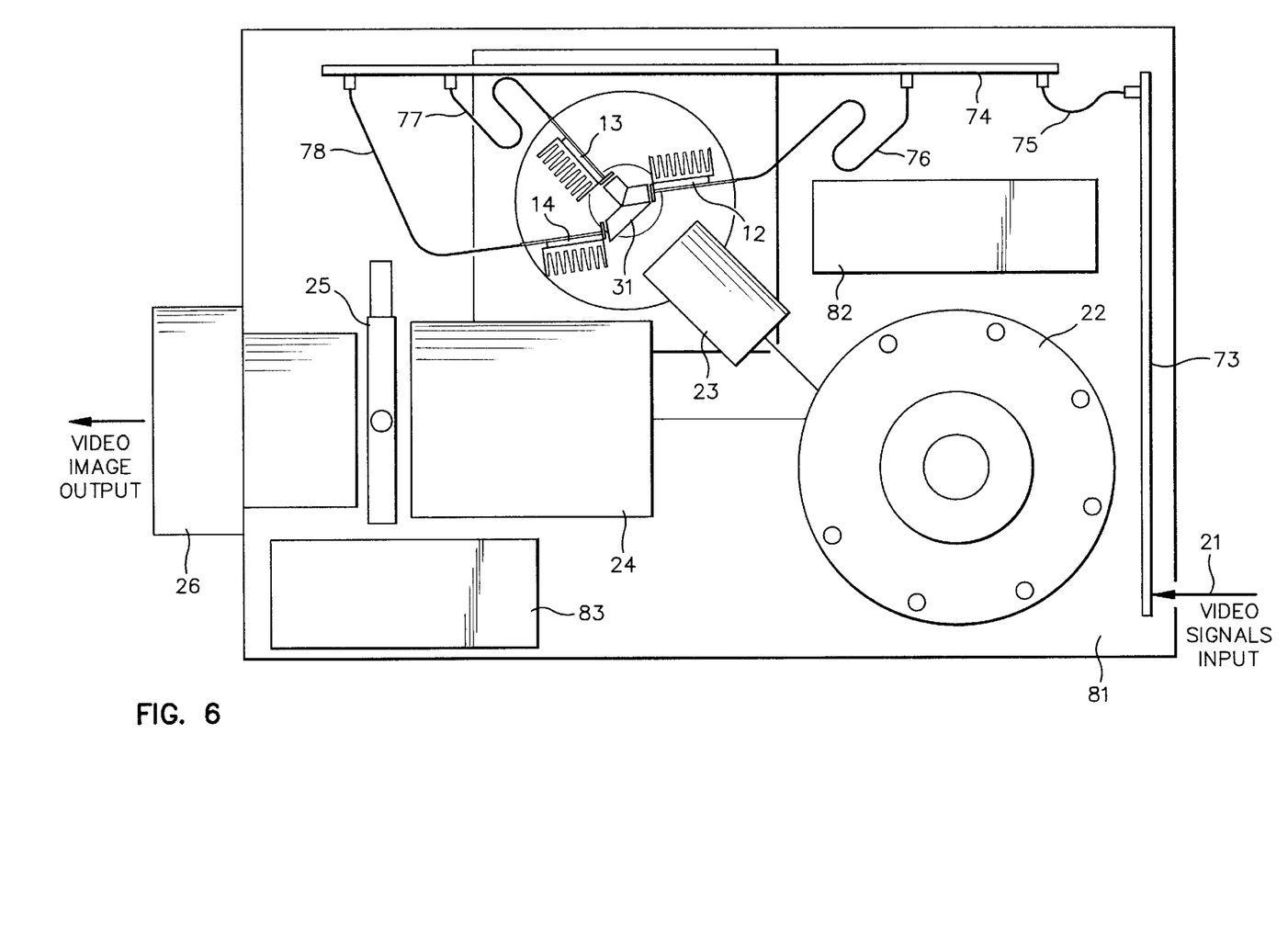
FIG. 6 is a plan view of the microlaser array projection system of the invention.
Figure 7:
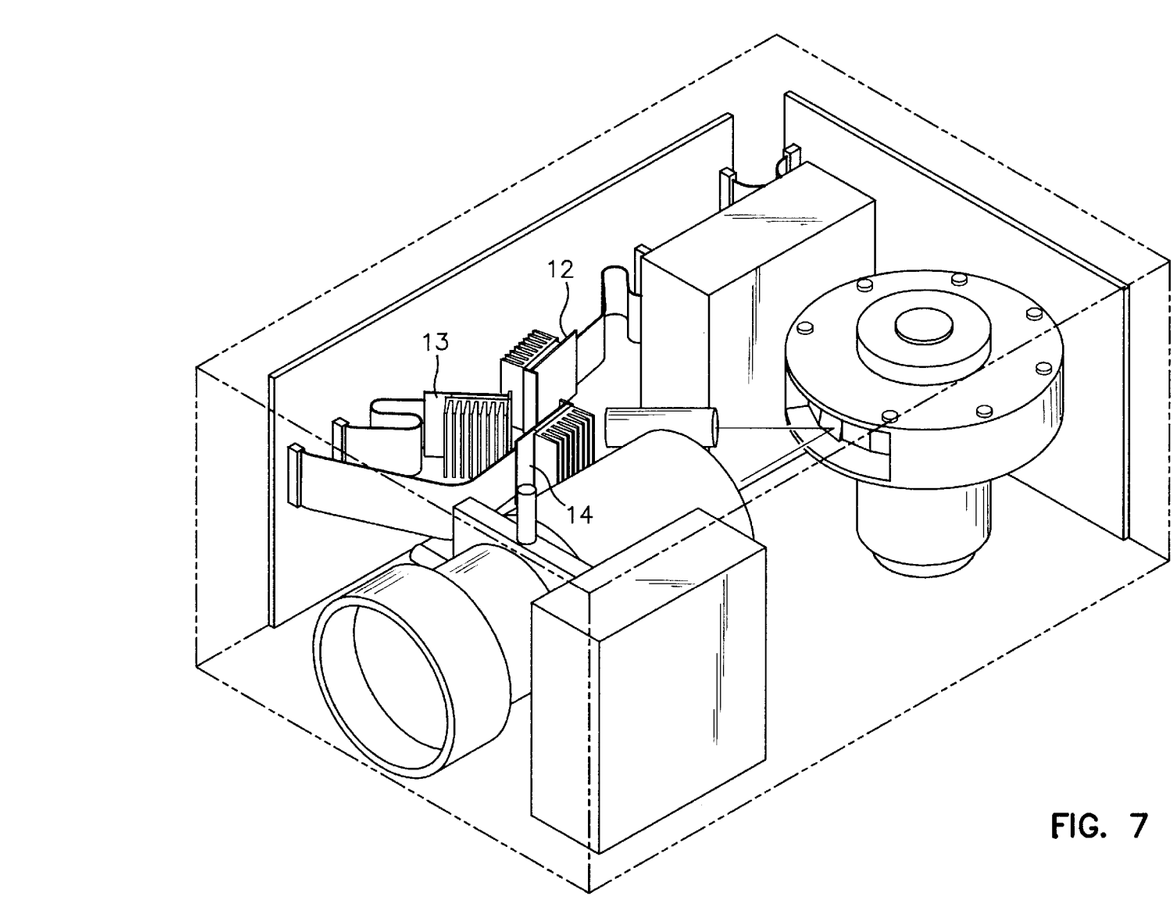
FIG. 7 is a perspective view of the system of FIG. 6.

Also shown in these structural system figures are projector control card 73 to which the video signals are applied through input 21, and diodes driver card 74, connected by cable 75 to card 73. Cables 76, 77 and 78 connect the respective laser diode/microlaser modules to driver card 74. Chassis 81 also includes power supply 82 and auxiliary power supply 83.

When a laser source is used for video image projection, each individual pixel at the screen comprises a large number of scattering sources. The intensity of the signal seen by an observer is the summation of the signals from each of these scattering points. Hence, in the presence of a non-moving monochromatic source and a non-moving screen, the video image is comprised of a complex interference pattern which is called speckle.

Prior laser based projection systems have suffered from this problem of image speckle which is intrinsic to narrowband laser sources. Such speckle manifests itself as fine grain intensity fluctuations in the viewed image, the specific distribution of fluctuations rearranging itself in a random fashion whenever the viewer's head executes small lateral motions. The visual effects of speckle detract from the aesthetic quality of an image and also result in a reduction of image resolution. Consequently, in the context of high resolution display systems, it is generally deemed essential that speckle be eliminated.

Of the many methods whereby elimination can be effected, four separate approaches are described briefly herein, each of which introduces an optical path randomizing media at an intermediate focal plane within the projection optics. These four randomizing media can be described as: spinning diffusion plates; flowing fluid diffusers; non-flowing fluid diffusers; and nutating diffusion plates.

When a spinning diffusion plate is located at an image plane of the projector system, elimination of speckle effects occurs for transverse plate velocities in excess of a few centimeters per second. Disadvantages associated with such devices involve their transmission inefficiency (~50%), the large numerical aperture of their output, and their general bulkiness. To circumvent the first two disadvantages, one can replace the ground glass surface, a structure previously suggested in the literature, by a thin sheet of wax supported between glass plates. This allows one to increase the forward transmittance of the screen to the 85%–95% regime while, at the same time, retaining high resolution in conjunction with forward scattering cones in the 10°–20° full width at half maximum (FWHM) range.

A flowing fluid diffuser comprises a pair of closely spaced glass plates between which a highly turbid fluid is caused to flow. Tests of this concept have been performed with a correction fluid suspension acetone. An example of such a product is "Liquid Paper" (a trademark of The Gillette Company). At modest flow rates, this technique results in complete elimination of speckle. However, it combines low transmission efficiency with the inconvenience of a pump and associated plumbing.

When the particles suspended in a fluid diffuser are sufficiently small in size, speckle is eliminated in the absence of flow. This phenomenon is caused by Brownian motion of the scattering particles. As such, it leads to a simple and compact device which, in the conventional sense, has no moving parts. A disadvantage of this type of speckle eliminator is that its transmission efficiency is limited, compared with what presently appears to be the best available system described below.

Figure 8:
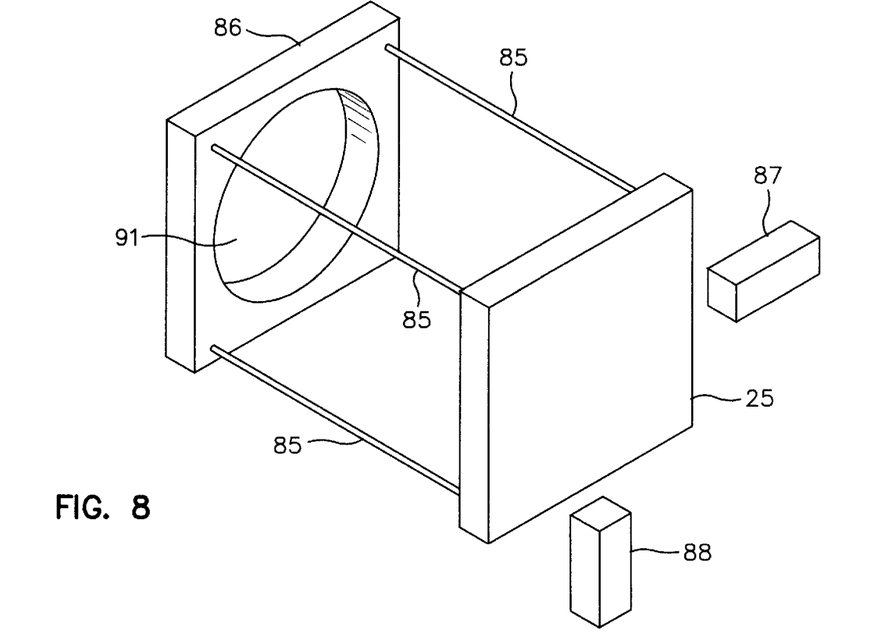
FIG. 8 is a conceptual representation of a speckle eliminator used in the invention.

At this time it appears that the best approach to speckle elimination is a novel nutating diffusion plate configuration. This preferred embodiment approach to speckle elimination takes advantage of the desirable properties of wax laminate diffusers (mentioned in connection with spinning diffusers), while packaging the resultant device in a less bulky configuration. A screen with linear dimensions which are slightly greater than the intermediate image within the projection system is employed. It is supported on springs, and caused to vibrate in a plane which lies perpendicular to the projection axis of the video image beam. A conceptual example is shown in FIG. 8. Screen 25 is supported by spring elements 85 from aperture plate 86, which is mounted to chassis 81. The nutation may be induced in screen 25 by orthogonal electromagnets 87,88. The image beam passes through opening 91 in plate 86 and then through speckle eliminator plate 25.

Motion relative to two orthogonal axes is induced in plate 25, together with a 90-degree phase shift between those motions, in order to avoid periodic moments of zero velocity which would be associated with simple harmonic motion along a single axis. The result is a non-rotating diffuser which undergoes rapid nutation, much in the manner of the contact surface of a orbital sander. Hence, all regions of the image are subjected to the same motion. An excursion of 1 millimeter at 60 Hz provides a constant transverse velocity of about 20 cm sec$^{-1}$. This yields an inexpensive device which is barely larger in cross section than the imaging beam itself.

Figure 9:
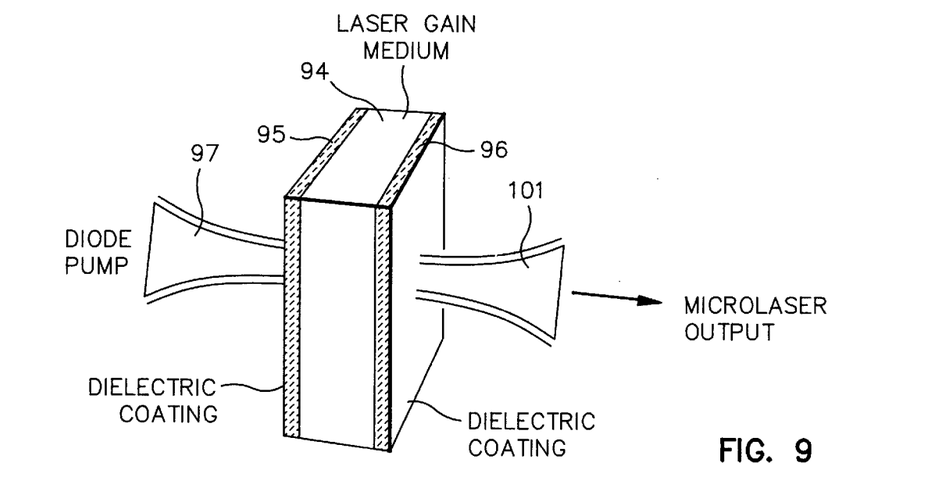
FIG. 9 illustrates an example of a diode laser-pumped microlaser employed in the invention.

Microlasers suited to image projection typically are fabricated by polishing wafer 94 of solid-state rare-earth doped gain medium so that two sides of the wafer are flat and parallel (see FIG. 9). The thickness of the wafer corresponds to the length of the laser cavity, which typically is on the order of 1 mm. Appropriate dielectric coatings 95 and 96 are deposited directly to the polished surfaces to form the mirrors of a two-mirror standing wave cavity.

Near-IR diode lasers, such as AlGaAs quantum well devices, are used to longitudinally pump the microlaser, as indicated by input 97. The diode laser wavelength can be temperature-tuned to a strong absorption band of a rate-earth ion, thus allowing very efficient operation. The planar uniformity of the flat-flat cavity is broken by pump beam 97, which deposits heat as it pumps the crystal. As the heat diffuses outward from the pumped volume, it forms a thermal waveguide that defines the transverse dimensions of the oscillating mode, typically 100–200 $\mu$m in diameter. The output is indicated by reference numeral 101. If smaller mode sizes are required, convex curvatures can be imparted onto the microlaser surfaces.

One of the techniques employed to generate visible light from a microlaser is based on frequency doubling of the near-IR emission of an aluminum galium arsenide (AlGaAs) diode laser pumped neodymium ion ($Nd^{3+}$) doped device. The AlGaAs output is tuned to the 0.809 $\mu$m absorption transition of $Nd^{3+}$, and lasing is achieved at 1.3 $\mu$m, 1.06 $\mu$m, and 0.9 $\mu$m. Using conventional frequency doubling techniques, visible light as 0.65 $\mu$m, 0.53 $\mu$m, and 0.45 $\mu$m is obtained. Thus red, green and blue laser output are achieved. The specific techniques to generate the various colored laser beams are not relevant to this system invention. Suffice it to say that operative techniques are described in the literature and are within the skill in this art. It should be recognized that frequency doubling can be accomplished with a single rare earth doped nonlinear material or with two adjacent materials, such as a rate earth doped crystal in combination with a second nonlinear crystal.

Since an individual microlaser occupies only a small volume within a host wafer and that volume is pumped along an axis which lies perpendicular to the plane of the wafer, it becomes a simple matter to incorporate an array of microlasers within a single wafer. In this regard, array geometries of microlasers are limited only by characteristics of the pump diode laser arrays and by the transverse mode dimensions mentioned above.

One approach for fabrication of microlaser arrays is to polish a slab or sheet of gain material flat and parallel with etalon parallelism tolerances. This slab is butt-coupled to a diode laser array, with laser action occurring at the positions of each diode laser pump. However, in a flat-flat microlaser slab the smallest spot size, and hence the minimum center-to-center spacing of individual microlaser elements, is limited by thermal diffusion and by the size of the resultant thermally induced index-waveguide. Even when the diode pump spots are extremely small, the thermal waveguide effect limits the spot size and center-to-center spacing to ~100 $\mu$m. This corresponds to 100 emitters/cm which is borderline for the HDTV requirements but this approach could work in the system of this invention.

Figure 10:
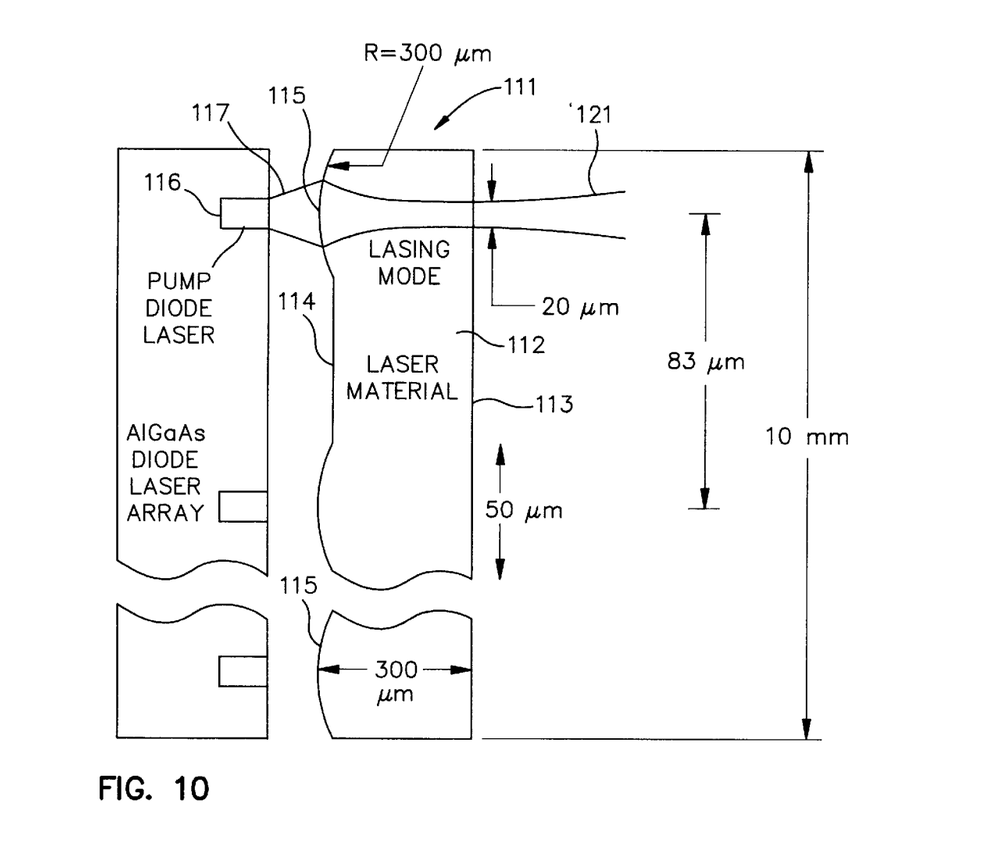
FIG. 10 is a conceptual diagram of a 120-element pumped microlaser array as used in the invention.

To achieve higher density microlaser arrays, the surfaces of the material can be modified such that the microlaser mode size is determined by surface curvatures and not by the pump-induced thermal waveguide effect. To attain a center-to-center emitter spacing of <100 $\mu$m and prevent crosstalk, the single element microlaser cavity design must be chosen to give a transverse mode diameter on the order of 20 $\mu$m. For a microlaser material with a typical index of refraction of 1.8, a 20 $\mu$m mode diameter is achieved with a confocal resonator of length 300 $\mu$m (a confocal resonator requires convex surface/mirror radii of curvatures equal to the cavity length). Convex surfaces, as shown in FIG. 10, reduce the lasing threshold. Indexes of refraction are different for different lasing materials, but that information is readily available as needed.

Individually addressed diode laser arrays have been produced with 83 $\mu$m center-to-center spacing with ~100 mW output per emitter. Each element within the array is a single mode diode laser with an output aperture of 1×20 $\mu$m and an emission bandwidth of <1 nm at output wavelengths of about 0.809 $\mu$m. These characteristics are well suited for pumping $Nd^{3+}$ doped microlasers. Also, such devices have been tested to 1 MHz amplitude modulation bandwidth with no sign of optical cross-talk between adjacent emitters.

As new visible heterostructure diode lasers become available, such as AlGaInP operating at red wavelengths, and II–VI diodes lasers, such as CdZnSe and AlGaInN operating at green and blue wavelengths, these elements can be employed in this system in place of the microlasers discussed above.

The particular configuration of FIG. 10 is provided as an example only. Sheet 111 of laser material 112, which as stated previously, may be a unitary or a compound sheet, includes flat side 113 which is polished and coated with a suitable dielectric as discussed above. Opposite side 114 is formed with a multiplicity of convex protrusions 115, each of which defines an individual microlaser. That surface, or at least the convex areas, are polished and coated with the appropriate dielectric material. As shown, the diameter of protrusions 115 on surface 114 is about 50 $\mu$m. A diode laser pump element 116 is aligned with each convex surface 115. Each diode laser is individually modulated in intensity so that it pumps its associated microlaser with 0.809 $\mu$m energy 117, causing lasing action, and the appropriate wavelength output 121 (red, green or blue) at the appropriate image intensity is emitted. The laser light so emitted is operated on as previously discussed in connection with the description of the system.

It is contemplated that there will be 120 microlasers within the laser material strip of 10 mm in length. The center-to-center spacing between adjacent microlaser elements is in the range of 83 $\mu$m. It could be less, depending on the configuration of the elements of the system, even as small as about 25 $\mu$m spacing. The thickness of the strip or sheet 111 is on the order of 300 $\mu$m and the radius of curvature of each convex protrusion 115 is also on the order of at least 300 $\mu$m. This relationship, where the radius of curvature is at least equal to the length of the cavity, should be maintained to ensure small laser modes and stable laser action. As each microlaser is pumped, it emits a beam of approximately 20 $\mu$m diameter. This set of parameters is by way of example only. It provides a suitable array of individually addressable microlasers and their associated individual diode laser pumping elements to enable the system of FIGS. 1–7 to work in the desired manner.

To satisfy the requirements for the image projection system of this invention, the microlaser array module should have the following characteristics: about 100 elements/cm; be capable of >1 MHz modulation bandwidth/element; have sufficiently small cross-talk to allow for contrast ratios >100:1; have a transmission efficiency >85%; have a drive voltage of <80 volts; be low in cost; and have a high yield in mass production.

Figures 11, 12, 12A:
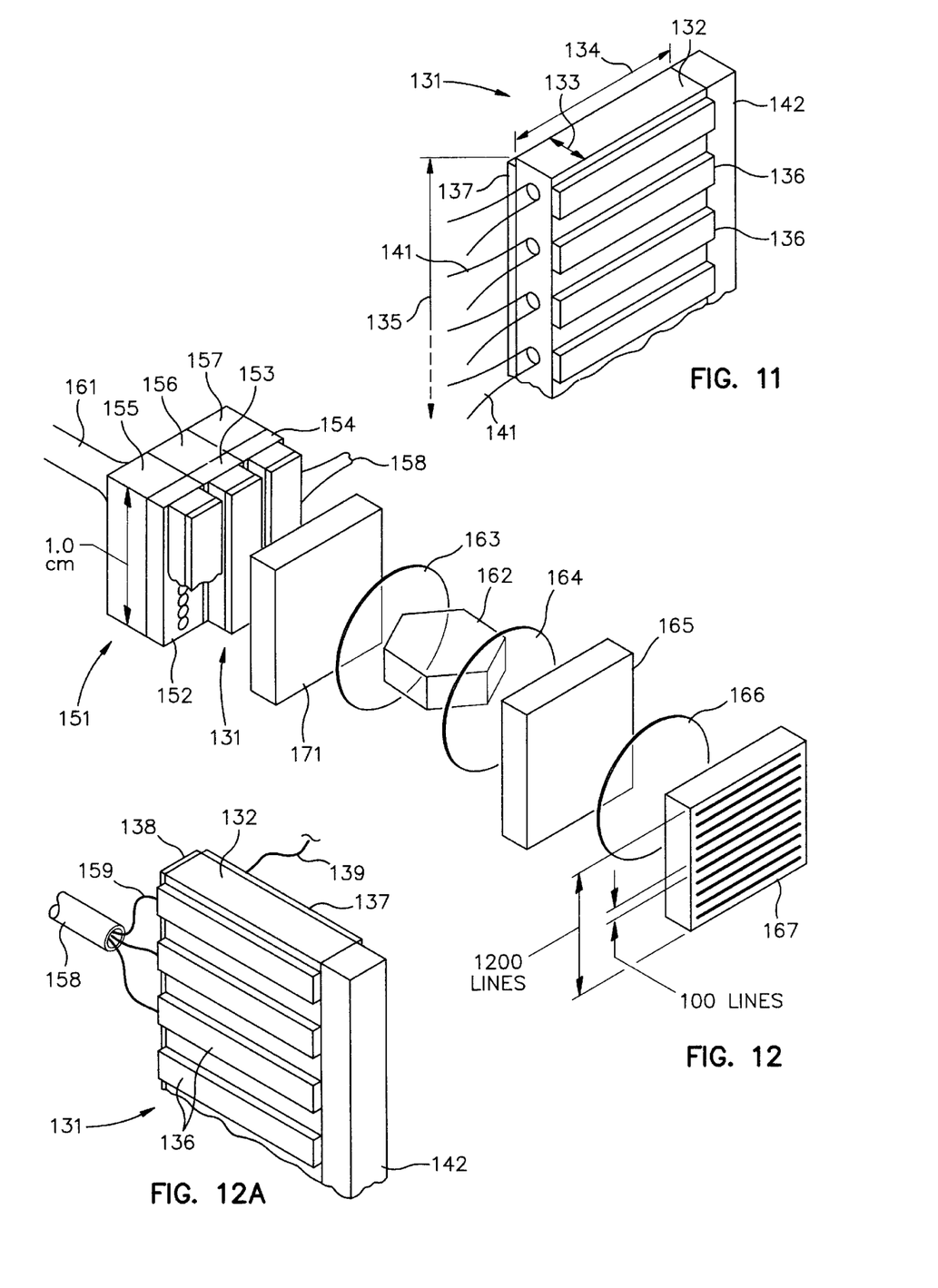
FIG. 11 is a perspective view of a linear array spatial light modulator for the microlaser array of the invention without external connections.
FIG. 12 is a conceptual schematic diagram similar to FIG. 1 of the preferred embodiment of the invention, employing several of the modulators of FIG. 11.
FIG. 12A is an enlarged perspective view of a spatial light modulator in the same orientation in which it is shown in FIG. 12.

An alternative, and preferred, embodiment of the laser/modulator array module is shown in FIGS. 11, 12 and 12A. FIG. 12 is quite similar to FIG. 1, with the addition of the linear array spatial light modulator 131 of FIG. 11. This embodiment of the invention is particularly capable of meeting the above criteria. As an example, the microlaser array employs spatial light modulators based upon the ceramic electro-optic material lead lanthanum zirconate titanate (PLZT). This material has been employed in light modulator applications such as for flash blindness goggles. Because the material is a ceramic, the fabrication technology is well developed so high yield, low cost devices can be realized.

With the proper composition, PLZT exhibits a large, fast electro-optic effect in the absence of a piezo-electric effect. The existence of a piezo-electric effect precludes the use of more conventional electro-optic crystals, such as $LiNbO_3$, due to acoustic ringing which gives rise to significant cross-talk between elements within a linear modulator array. One composition for a spatial light modulator which satisfies the requirements set out above is a 9/65/35 PLZT which exhibits a cubic symmetry, a quadratic electro-optic effect, and a zero piezo-electric effect. Further, this material displays high transmission per unit length (~95%/mm) in the spectral region extending from ~450 nm to ~670 nm, the region of interest here. This composition has 9% lanthanum and the remainder is a 65:35 ratio mixture of lead zirconate and lead titanate, respectively. This is a non-ferroelectric state of PLZT, having a piezo-electric coefficient of zero. There are some PLZT compositions which exhibit a piezo-electric-effect and they would not be suitable for this application.

The linear array spatial light modulator shown in FIG. 11 may be made with the following characteristics, listed here only as an example. Thickness 133 of wafer 132 if 0.2 mm, its width 134 is 1 mm, and its length 135 is 10 mm. This wafer has 100 Cr/Au electrodes 136 which are 50 $\mu$m wide, with the pitch between electrodes of 100 $\mu$m. The electrodes are deposited on one side of the wafer and ground plane 137 is deposited on the other side. Appropriate wire bonding techniques may be employed to connect electrical signals to each electrode. Injected microlaser array beamlets 141 from each microlaser element in an array, such as array 152, are 50 $\mu$m in diameter and their input polarizations are oriented at 45° to the applied electric field. To ensure 45° polarization of the laser beamlets from any microlaser array, it may be necessary to interpose a wave plate or phase retarder 138 (FIG. 12A) between a microlaser array and modulator 131. In the embodiment contemplated, the red and blue microlaser outputs need phase retarders to achieve 45° polarization, while the green output is already polarized at 45°. Polarization analyzer 142 is bonded to the output side of modulator wafer 132 and its polarization at zero modulation voltage is oriented at 90° relative to the input polarization. Under these conditions, when no modulation voltage is applied to electrodes 136 there is no light output from the microlaser array module. With the module dimensions given above, and the known electro-optic coefficients of 9/65/35 PLZT, the half wave voltage (voltage required to intensity modulation from full ON to full OFF) is ~70 V.

By applying a video signal voltage, entering through cable 158 to a specific electrode, the polarization of the respective microlaser beamlet is rotated, resulting in polarization modulation in wafer 132 of the video voltage signal. The output of the module from analyzer 142, is thereby amplitude modulated. Thus the microlaser array beamlets are simultaneously adjusted in amplitude by changing the voltages amplitudes applied to the 100 electrodes on each wafer 132.

For completeness, the other image projection system elements will be called out. The only differences between FIG. 12 and FIG. 1 are in microlaser array module 151 and its external connections. In place of current driver video input 21, which directly modulated each laser pumping diode in arrays 15, 16 and 17 in FIG. 1, input cable 161 is a power connection only. In this preferred embodiments, all the pumping diodes in arrays 155, 156 and 157 are on continuously, thereby continuously energizing each microlaser element in arrays 152, 153 and 154. A voltage driven video input signal is employed in the FIG. 12 embodiment, referred to generally by reference numeral 158. In FIG. 12A, cable 158 is seen to be comprised of many wires 159, one connected to each electrode 136 on wafer 132. An external ground connection may be made to ground plane 137 by wire 139. In actuality, individual connections are likely made to electrodes 136 by conventional wire bonding.

The output beams from module 151, fully modulated as they were from module 11 in FIG. 1, are then combined by such means as combiner 171, possibly the dichroic prism shown in FIG. 3. The laser beams then proceed through relay lens 163, are scanned as previously described by scanner 162, pass through imaging lens 164, speckle eliminator 165, projection lens 166 and finally onto projection screen 167.

It should be noted that the modulation apparatus in the FIG. 1 embodiment comprises video or image input 21 and laser diodes 15, 16 and 17. The modulation means in the FIG. 12 embodiment comprises image input 158, wires 159, wafer 132, and electrodes 136. Similarly, the red, green and blue laser elements of FIG. 1 are individually addressed in the manner that they are excited or energized by the modulation means. In the FIG. 12 embodiment the laser elements are continuously excited and it is the output beams that are individually addressed and modulated. Of course, each laser element is individually pumped in both embodiments.

The combining element is shown as dichroic prism 31, but other structures could be devised to accomplish the same result. Unitary microlaser block 11 shown in FIG. 1 is actually contemplated to be made in separate spaced elements as shown in FIGS. 6 and 7. That particular arrangement corresponds with the geometry of prism 31. A different combiner would likely result in a different physical arrangement of the microlaser arrays and, of course, the mating spatial light modulators of FIG. 12.

There are very significant advantages to this invention. Because of the parallel nature of the scanning configuration (multiple beams in a "paintbrush" arrangement), both amplitude modulation bandwidth and the power required for each microlaser emitted is reduced by a factor of 100 in relation to a single beam approach. A 100-element microlaser array-based projector requires a modulation bandwidth of ~1 MHz for each microlaser beamlet. Of course, whether 100, 120, or some other number of microlaser elements is used only modifies the numbers without changing the invention.

Upon review of the above detailed description it is likely that modifications and improvements will occur to those skilled in the art which are within the scope of the accompanying claims. The specifically described speckle eliminator is not the only one that can be used in the system. There may be applications of the system where no speckle eliminator is necessary. Further, while a glass/wax laminate plate is described, other substances which accomplish the function of an optical path randomizing media can be used. The particular microlaser array configuration of FIG. 10 is not absolutely required for proper operation of the system of the invention, although it offers some definite advantages over the known prior art.

We claim:

1. A high resolution image projection system comprising:
    an array of a multiplicity of lasers for each of the three primary colors of the image projection system, said multiplicity of lasers comprising
        linear arrays of microlaser elements having inputs and outputs and
        equivalent linear arrays of laser diodes for individually pumping each said microlaser element in each said arrays;
    means for energizing each said laser in each said array;
    a spatial light modulator for modulating the beam intensity output of each said laser, said spectral light modulator comprising:
        linear array spatial light modulators having input and output sides, their input sides confronting and in alignment with the laser beam outputs of said microlaser arrays;
        means on said spatial light modulators for receiving image signals, said image signals individually polarization modulating the laser beam outputs from each said microlaser element; and
        a polarization analyzer at the output side of said spatial light modulators, the output of said polarization analyzer being an amplitude modulated video signal;
    a beam combiner for combining the modulated outputs so that those outputs are in precise registration with each other;
    an apparatus for scanning the outputs of each said combined laser beam output; and
    an optical system for forming the scanned beams into a projection beam.

2. The system recited in claim 1, and further comprising:
    means for receiving an image signal;
    means for coupling said image signal to said spatial light modulator to produce modulation signals which thereby individually modulate each said laser.

3. The system recited in claim 1, wherein said scanning apparatus comprises means for two-dimensional scanning of said combined laser beam output.

4. The system recited in claim 1, wherein:
    each said spatial light modulator array is formed with a ground plane on one side and a multiplicity of electrodes on the opposite side, said electrodes being equivalent in number to said microlaser elements, one said electrode being operationally coupled to the output of each said microlaser element; and
    said spatial light modulator comprising individual video voltage inputs to each said electrode to thereby polarization modulate the laser beam output from each said microlaser element.

5. The system recited in claim 1, and further comprising a phase retarder selectively interposed between said microlaser array outputs and said input side of said spatial light modulator, said inputs to all said spatial light modulators being polarized at about 45°, the polarization of said polarization analyzer being oriented at about 90° relative to the polarization of said inputs.

6. The system recited in claim 4, wherein at zero modulation voltage the output of each said microlaser element/spatial light modulator/polarization analyzer is zero.

7. The system recited in claim 1, wherein said spatial light modulators are 9/65/35 lead lanthanum zirconate titanate (PLZT).

8. The system recited in claim 1, wherein said microlaser arrays are arranged in a fixed relationship configuration to each other and each said laser diode array is arranged in a mating relationship with each said microlaser array.

9. The system recited in claim 8, wherein each said microlaser element is defined by a convex surface aligned with its associated diode laser pumping element.

10. The system recited in claim 1, wherein said output combining means comprises a dichroic prism which accepts the inputs from each of said three laser arrays and provides a single output for each corresponding laser in said three arrays.

11. The system recited in claim 1, wherein said scanning apparatus comprises a rotating wheel having a plurality of facets, each facet having a different angle of tilt with respect to each adjacent facet, each said facet thereby producing a one-dimensional sweep of said combined laser outputs, each adjacent facet shifting the combined laser outputs in a second orthogonal dimension between sweeps.

12. The system recited in claim 1, and further comprising a speckle eliminator interposed in said scanned beams.

13. The system recited in claim 12, wherein said speckle eliminator comprises means for diffusing the light in said scanned beams.

14. The system recited in claim 13, wherein said diffusion means is a rigid plate structure comprising:
- a first glass plate;
- a second glass plate parallel with and spaced from said first glass plate; and
- light diffusing material supported between said first and second glass plates.

15. The system recited in claim 14, wherein said light diffusing material is wax.

16. The system recited in claim 14, wherein said speckle eliminator further comprises means to move said rigid plate in a nutational manner.

17. The system recited in claim 16, wherein said nutational moving means comprises motion inducing elements orthogonally arranged with respect to said rigid plate and incorporating a 90-degree phase shift between the motions of said orthogonal elements to avoid periodic moments of zero velocity.

18. A method for projecting a high resolution image, the method comprising the steps of:
- preparing an array of a multiplicity of red laser emitters, an array of a multiplicity of green laser emitters, and an array of a multiplicity of blue laser emitters in a fixed relationship configuration to each other;
- pumping said red, green, and blue emitters to cause laser light output beams to be emitted therefrom, the output beams from said red, green and blue output beams being polarized at a predetermined angle;
- individually addressing the laser light beams with image signals to modulate them by causing the polarization of each said laser beam to rotate in response thereto;
- applying the laser beams to a polarization analyzer having its polarization oriented at 90° to the polarization orientation of the laser beams prior to their being modulated, the outputs from the polarization analyzer being amplitude modulated;
- optically combining the laser outputs to form a multiplicity of parallel beams equal in number to the number of lasers in each array;
- repeatedly scanning said parallel beams across a limited angle, thereby forming a composite output image beam; and
- focusing the image beam at a predetermined location to form a complete image.

19. The method recited in claim 18, and comprising the further step of selectively rotating the polarization of the laser beams which are output from said red, blue and green lasers by a predetermined amount so that all said laser beams from said lasers are polarized at the same angle prior to said modulation step.

20. The method recited in claim 18 further comprising the step of two-dimensionally scanning said parallel beams.

21. The method recited in claim 18 further comprising the step of scanning said parallel beams with a single rotating wheel, each scan being at a different tilt angle with respect to the time adjacent scan.

22. A high resolution image projection system that scans an image on a projection screen, comprising:
- a plurality of laser sources that generate a plurality of arrays of a multiplicity of laser beams for each of the three primary colors of the image projection system;
- a spatial light modulator array that modulates the beam intensity of said arrays of laser beams, said spatial light modulator array comprising:
  - a plurality of linear array spatial light modulators having input and output sides, their input sides confronting and in alignment with the laser beam arrays;
  - a polarization modulator on said linear array spatial light modulators that individually polarization modulate the laser beams in the laser beam arrays; and
  - a polarization analyzer at the output side of said linear array spatial light modulators, the output of said polarization analyzer being an amplitude modulated video signal; and
- a scanner that scans said plurality of modulated laser beam arrays along multiple lines of said image in parallel; and
- an optical system that forms the scanned beams into a projection beam focused onto said projection screen to provide said image.

23. The system recited in claim 22 wherein said plurality of laser sources includes at least one diode-pumped solid state laser.

24. The system recited in claim 22, wherein said scanner comprises means for two-dimensional scanning of said modulated laser beam arrays.

25. The system recited in claim 22 wherein:
- each said linear array spatial light modulator is formed with a ground plane on one side and a multiplicity of electrodes on the opposite side, said electrodes being equivalent in number to said laser beam arrays, one said electrode being operationally coupled to the output of each said laser beam arrays; and
- each said linear array spatial light modulator comprises individual video voltage inputs to each said electrode to thereby polarization modulate each laser beam output.

26. The system recited in claim 25, wherein at zero modulation voltage, the output of each said spatial light modulator/polarization analyzer is zero.

27. The system recited in claim 25 and further comprising a phase retarder selectively interposed between said laser beam arrays and said input side of said linear array spatial light modulator, said inputs to all said linear array spatial light modulators being polarized at about 45°, the polarization of said polarization analyzer being oriented at about 90° relative to the polarization of said inputs.

28. The system recited in claim 22 further comprising a beam combiner that combines the laser arrays output from said polarization analyzer and provides a single combined laser array.

29. The system recited in claim 22, wherein said scanner comprises a rotating wheel having a plurality of facets, each facet having a different angle of tilt with respect to each adjacent facet, each said facet thereby producing a one dimensional sweep of said modulated laser beam arrays, each adjacent facet shifting the modulated laser beam arrays in a second orthogonal dimension between sweeps.

30. The system recited in claim 22, and further comprising a speckle eliminator interposed in said scanned beams.

31. The system recited in claim 30, wherein said speckle eliminator comprises a light diffuser in said scanned beams.

32. The system recited in claim 31, wherein said speckle eliminator further comprises means to move said light diffuser in a nutational manner.

33. The system recited in claim 32, wherein said nutational moving means comprises motion inducing elements orthogonally arranged with respect to said rigid plate and incorporating a 90-degree phase shift between the motions of said orthogonal elements to avoid periodic moments of zero velocity.

34. A method for displaying a high resolution scanned image, the method comprising the steps of:
- generating an array of a multiplicity of red laser beams, an array of a multiplicity of green laser beams, and an array of a multiplicity of blue laser beams in a fixed relationship configuration to each other, said red, green and blue beams being polarized at a predetermined angle;

individually modulating said red, green, and blue laser beams with image signals to modulate them by causing the polarization of each said laser beam to rotate in response thereto;

applying the laser beams to a polarization analyzer having its polarization oriented at 90° to the polarization orientation of the laser beams prior to their being modulated, the output from the polarization analyzer being amplitude modulated arrays of laser beams;

scanning said modulated arrays of laser beams across a limited angle; and imaging said scanned output beams at a predetermined location to a form a complete image.

35. The method recited in claim 34, and further comprising the step of selectively rotating the polarization of the laser beams that are output from said red, blue and green lasers by a predetermined amount so that all said laser beams from said lasers are polarized at the same angle prior to said modulation step.

36. The method recited in claim 34 further comprising the step of two-dimensionally scanning said modulated arrays of laser beams.

37. The method recited in claim 36 further comprising the step of repeatedly scanning said modulated arrays of laser beams with a single rotating wheel, each scan being at a different tilt angle with respect to the time adjacent scan.

38. The method recited in claim 34 further comprising the step of optically combining the multiplicity of red, green, and blue laser outputs of the polarization analyzer to form a combined array that includes a multiplicity of combined laser outputs.

* * * * *